United States Patent
Lin et al.

(10) Patent No.: US 10,534,330 B2
(45) Date of Patent: Jan. 14, 2020

(54) SELECTING A LEVEL OF AUTONOMY

(71) Applicant: Vivint, Inc., Provo, UT (US)

(72) Inventors: Rongbin Lanny Lin, Orem, UT (US); Brandon Bunker, Highland, UT (US)

(73) Assignee: Vivint, Inc., Provo, UT (US)

( * ) Notice: Subject to any disclaimer, the term of this patent is extended or adjusted under 35 U.S.C. 154(b) by 680 days.

(21) Appl. No.: 14/304,678

(22) Filed: Jun. 13, 2014

(65) Prior Publication Data

US 2015/0363701 A1      Dec. 17, 2015

(51) Int. Cl.
    *G06N 5/04*      (2006.01)
    *G05B 15/02*     (2006.01)

(52) U.S. Cl.
    CPC .................. *G05B 15/02* (2013.01)

(58) Field of Classification Search
    USPC .................................................. 700/275
    See application file for complete search history.

(56) References Cited

U.S. PATENT DOCUMENTS

| | | |
|---|---|---|
| 2005/0171645 A1 | 8/2005 | Oswald et al. |
| 2005/0192915 A1* | 9/2005 | Ahmed ............... G06N 3/02 706/21 |
| 2010/0289643 A1* | 11/2010 | Trundle ............. F24F 11/0086 340/545.1 |
| 2011/0054689 A1 | 3/2011 | Nielsen et al. |
| 2011/0125329 A1 | 5/2011 | Oswald |
| 2012/0205920 A1 | 8/2012 | Gold et al. |
| 2012/0319597 A1* | 12/2012 | Park ................. H05B 37/0227 315/154 |
| 2014/0148952 A1 | 5/2014 | Paz Lopez et al. |
| 2014/0324192 A1* | 10/2014 | Baskaran ............. G05B 15/02 700/19 |
| 2015/0039105 A1* | 2/2015 | Lee .................. H04L 12/2827 700/90 |

FOREIGN PATENT DOCUMENTS

| | | | |
|---|---|---|---|
| EP | 1006419 A1 * | 6/2000 | ............ G05B 15/02 |
| EP | 1006419 A1 | 6/2000 | |

OTHER PUBLICATIONS

Urdiales et al., "A new multi-criteria optimization strategy for shared control in wheelchair assisted navigation" Autonomous Robots, Issue 20, 2011, pp. 179-197 (Year: 2011).*
International Search Report for International Application No. PCT/US2015/034067, dated Oct. 15, 2015 (4 pp.).
Monica Dragoicea et al., "Integrating Agents and Services for Control and Monitoring: Managing Emergencies in Smart Buildings," University Politehnica of Bucharest, Department of Automatic Control and Systems, Mar. 2014, pp. 154-159, (http://www.academia.edu/6663793/Integrating_Agents_and_Services_for_Control_and_Monitoring_Managing_Emergencies_in_Smart_Buldings).

(Continued)

*Primary Examiner* — Emilio J Saavedra
(74) *Attorney, Agent, or Firm* — Holland & Hart, LLP

(57) ABSTRACT

Methods and systems are described for selecting a level of autonomy. According to at least one embodiment, a method for selecting a level of autonomy includes determining a first likely condition of a first user of a task and/or building system, selecting a first autonomy level from multiple levels based at least in part on the first likely condition, and making a first decision in the task and/or the building system based on the first autonomy level.

20 Claims, 11 Drawing Sheets

(56) References Cited

OTHER PUBLICATIONS

Munjal Desai, "Sliding Scale Autonomy and Trust in Human-Robot Interaction," University of Massachusetts, Lowell, Mar. 13, 2014, pp. 1-73 (http://robotics.cs.uml.edu/fileadmin/content/publications/2007/).

Parasuraman et al., A Model for Types and Levels of Human Interaction with Automation, IEEE Transactions on Systems, Man, and Cybernetics—Part A: Systems and Humans, vol. 30, No. 3, May 2000, pp. 286-297.

Supplementary European Search Report for EP Application No. 15806711.6, dated Dec. 19, 2017 (8 pp.).

\* cited by examiner

SELECTING A LEVEL OF AUTONOMY

BACKGROUND

Many homeowners have security systems and/or automation systems installed in their homes. Such systems bring peace of mind and simplify the homeowners' lives. Generally speaking, such systems include rule based decision processes that cause the security and/or automation systems to perform specific tasks. Such tasks may include turning on a security camera in response to something tripping a motion detector, turning off a predetermined light at a predetermined time, and so forth.

SUMMARY

Methods and systems are described for selecting a level of autonomy. According to at least one embodiment, a method for selecting a level of autonomy includes determining a first likely condition of a first user of a task and/or building system, selecting a first autonomy level from multiple levels based at least in part on the first likely condition, and making a first decision in the task and/or the building system based at least in part on the first autonomy level.

The first likely condition may be an actual condition of the user, the building, or another condition that would otherwise affect how the user would want the building system and/or task to interact with him or her. In other examples, the condition is a perceived condition determined by the system. Such a perceived condition may not be an accurate condition, but such a condition may be close enough to an accurate condition that such a perceived condition can be used for determining how the user desires the system to interact with him or her. For example, the system may perceive that there is a high crime rate in a neighborhood based on published online articles about the neighborhood. Such a perceived condition may or may not be true, but the system may still use such a condition to determine how the user would likely desire the system to interact with him or her. For the purposes of this disclosure, a "user condition" and a "likely condition" will be used interchangeably throughout this specification.

Tasks may be associated with the building system. Such tasks may be implemented by the building system or another system. Such tasks may be service tasks for implementing a service associated with the building system.

The building system may be any appropriate type of system that is operable in a building. For example, such a building system may be a climate control system, a lighting system, a security system, a watering system, a door system, another type of system, or combinations thereof.

Any appropriate type of likely condition may be used with the method. For example, the likely condition may be based on an analysis of the user's historical behavior, satisfaction ratings from the user about the autonomous actions taken by the building system, failures of the first user to respond to recommendations made by the building system, other analysis, or combinations thereof. In some examples, the likely condition is a location of the first user, is based on an inference extrapolated from other users with at least one similar characteristic with the first user, is a building condition, another type of condition, or combinations thereof. Furthermore, the likely condition may be a task specific user condition.

In some examples, selecting the first autonomy level from the multiple levels based on the first likely condition comprises sending autonomy options to the first user and selecting the first autonomy level based on a response from the first user. The autonomy level may also be changed. In some circumstances, the autonomy level is changed based on updated likely conditions and/or user input. In some embodiments, the user is notified after the system implements a decision.

In some examples, the likely condition is a user specific user condition. In such circumstances, the method may include determining a second likely condition for a second user of the building system, selecting a second autonomy level based on the second likely condition, and making a second decision in the building system based on the second autonomy level.

In another aspect of the principles described herein, a computing device is configured for selecting an autonomy level. The computing device includes a processor, memory in electronic communication with the processor, and instructions stored in the memory. The instructions are executable by the processor to determine a user condition of a user of a building system, select an autonomy level from multiple levels based on the user condition, and make a decision in the building system based on the autonomy level.

In yet another aspect of the principles described herein, a computer program product is used for selecting a level of autonomy. The computer-program product includes a non-transitory computer-readable medium having instructions thereon. The instructions are executable by a processor to determine a user condition of a user of a building system, select an autonomy level from multiple levels based on the user condition, and make a decision in the building system based on the autonomy level.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
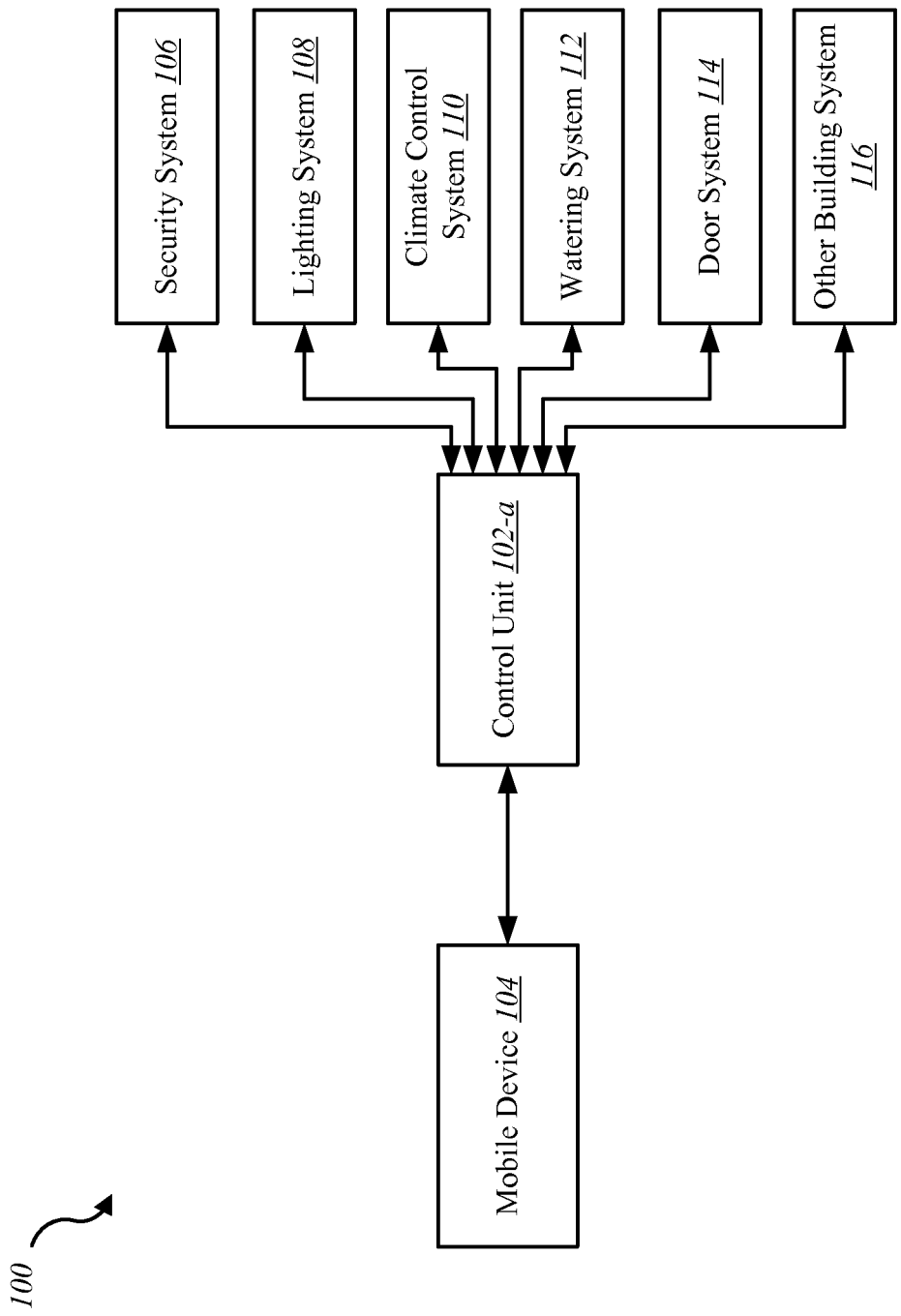
FIG. 1 is a block diagram of an example of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation, home security and related security systems and automation for use in commercial and business settings. More specifically, the systems and methods described herein relate to an improved arrangement for how such systems interact with the users of the system. The principles described herein determine how the user prefers the systems to interact with the user. For example, an analysis of the user may reveal that a particular user desires to make many decisions for how the security and automation systems operate. In such circumstances, these systems allow the user to make those decisions. On the other hand, another user of the same system may desire that all of the decisions be made by these systems. In such a circumstance, the systems can make all of the decisions on behalf of the user. Accordingly, one autonomy level causes the system to make all of the decisions on the user's behalf, and another autonomy level has the user make all of the decisions. However, other levels of autonomy has the user making some of the decisions and the system making other decisions on the user's behalf. For example, an analysis of the user may reveal that the user desires to make certain decisions, but desires the system to make other decisions. In that circumstance, the system adjusts to allow the user to make decisions that the user desires to make and the system will make the remaining decisions.

As used herein, the term "module" includes a combination of hardware and programmed instructions that are necessary for performing the designated function of the module. Components of the modules may be located on the same physical device or some of the components may be located at remote locations that are in communication with the other components of the module.

FIG. 1 is a block diagram depicting one embodiment of an environment 100 in which the present systems and methods may be implemented. In some embodiments, the environment 100 includes a control unit 102-a that is in communication with at least one mobile device 104. The control unit 102-a is also in communication with various systems, such as a security system 106, lighting system 108, a climate control system 110, a watering system 112, a door system 114, another building system 116, or combinations thereof.

Any appropriate mechanism for communicating between the control unit 102-a, the mobile device 104, and the systems may be used. In some examples, a wireless network is utilized to communicate between the control unit 102-a, the mobile device 104, and the systems. Examples of networks that may be used include, but are not limited to, local area networks (LAN), wide area networks (WAN), virtual private networks (VPN), wireless networks (using 802.11, for example), and/or cellular networks (using 3G and/or LTE, for example), Bluetooth networks, z-wave networks, ZigBee networks, other types of networks, or combinations thereof.

The control unit 102-a may control at least a part of the security and/or automation system. For example, other sensors and/or actuators may send information to the control unit 102-a where the signals are processed. Such sensors may include, for example, a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global positioning system (GPS) sensor, Wi-Fi positioning system sensor, capacitance sensor, radio frequency sensor, near-field sensor, heartbeat sensor, breathing sensor, oxygen sensor, carbon dioxide sensor, brain wave sensor, movement sensor, voice sensor, other types of sensors, or combinations thereof. Such actuators may include, but are not limited to, automated door locks, climate control adjusters, lighting adjusters, sensors activation mechanisms, other types of actuators, or combinations thereof.

The control unit 102-a has the ability to make decisions based on the communications from the sensors. For example, based on the information sent from the sensors to the control unit 102-a, the control unit 102-a may make a decision to activate an alarm, adjust a climate control setting, open or close a window, lock or unlock a door, control a security parameter, manage energy consumption, check the status of a door, locate a person or item, control lighting, control cameras, receive notifications regarding a current status or anomaly associated with a building, perform another task, or combinations thereof. In some cases, a decision may be decided at one of the local sensors, and the local sensors may or may not notify the control unit 102-a of the decision and/or resulting action.

Tasks may be associated with the building systems. Such tasks may be implemented by the building system, by the control unit 102-a through the building system, or another system. Such tasks may be service tasks for implementing a service associated with the building system.

While the control unit 102-a has the ability to make decisions based on input from the sensors, the control unit 102-a may make decisions just in those circumstances that are desirable to the user. The control unit 102-a may determine the conditions of the user to decide whether the user desires the control unit 102-a to make certain types or any decisions on behalf of the user. In some circumstances, the user may desire to retain the ability to decide when certain tasks are executed rather than letting the system make those decisions.

Based on the analysis of the user and determination of the user's conditions, the control unit 102-a may assign a level of autonomy to the system and/or task. The level of autonomy indicates how the control unit 102-a will interact with the user. For example, one level of autonomy indicates that the control unit 102-a will make all of the decisions on behalf of the user. Another level of autonomy indicates that the user will make all of the decisions. Yet, another level of autonomy indicates that the control unit 102-a will make just those decisions dealing with safety while the user makes the rest of the decisions. In an additional example, one level of autonomy may indicate that the control unit 102-a will make decisions for certain systems while the user will make decisions for other system. While the above examples have been described with reference to different decision allocations to the control unit 102-a and the user, any allocation of decisions between the control unit 102-a and the user may be used in accordance with the principles described herein.

Figure 2:
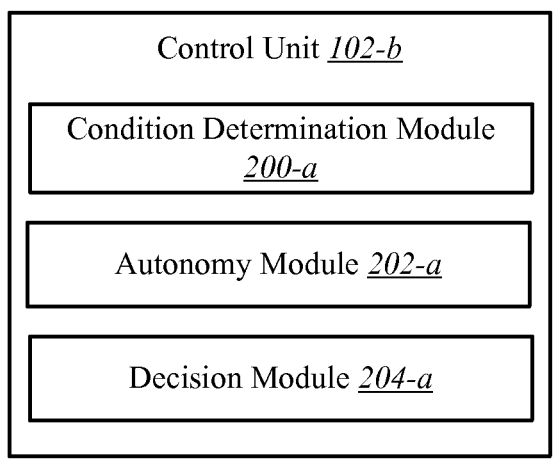
FIG. 2 is a block diagram of an example of a control unit of the environment shown in FIG. 1.

FIG. 2 is a block diagram illustrating one example of a control unit 102-b. In this example, the control unit 102-b has an condition determination module 200-a, an autonomy module 202-a, and a decision module 204-a. The control unit 102-b may be an example of the control unit 102-a described with reference to FIG. 1.

The condition determination module 200-a determines the conditions of the user. Such conditions may be conditions that reflect the user's desire to make decisions. For example, a user condition may be reflected in the user's response to recommendations from the system to perform certain tasks. If the user always accepts the system's recommendations, the system may infer that the system is correctly understanding how the user wants the system to act. In contrast, if the user ignores such recommendations, the system may determine that the user should be given the option to make the decisions for the system. In another example, if the user responses affirmatively for some types of recommendations while ignoring other types of recommendations, the system may infer that it can make decisions just for those areas where the system made recommendations to the user's liking, while allowing the user to make decisions in other areas.

The autonomy module 202-a assigns a level of autonomy based on the user's condition. The level of autonomy reflects whether the system or the user will make certain kinds of decisions. In some examples, the level of autonomy is different for different users of the systems. Further, the level of autonomy may be assigned for specific tasks or specific systems. For example, a first level of autonomy may be assigned to a user for the watering system while a different level of autonomy is assigned to the same user for the lighting system.

The decision module 204-a makes the appropriate decisions for the user and system based on the level of autonomy assigned to the user. For example, if the system is given a high level of autonomy, the decision module 204-a may make decisions for how to operate the system with just a little or no input from the user. On the other hand, if the system is given a low level of autonomy, the system may execute decisions just when the user has provided input.

Figure 3:
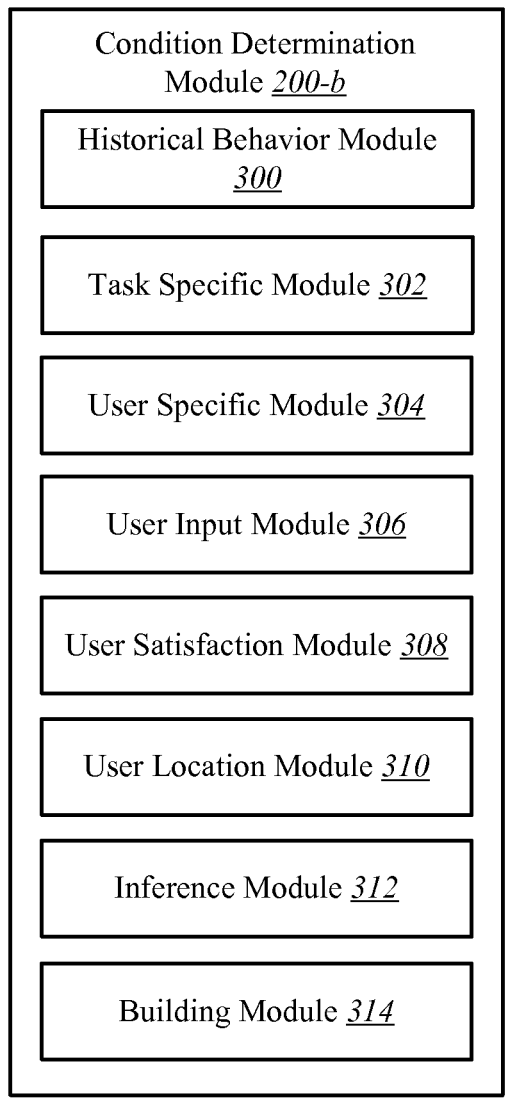
FIG. 3 is a block diagram of an example of a condition determination module of the control unit of FIG. 2.

FIG. 3 is a block diagram illustrating an example of a condition determination module 200-b. In this example, the condition determination module 200-b includes a historical behavior module 300, a task specific module 302, a user specific module 304, a user input module 306, a user satisfaction module 308, a user location module 310, an inference module 312, and a building module 314. The condition determination module 200-b may be an example of the condition determination module 200-a described with reference to FIG. 2.

The historical behavior module 300 analyzes the data about the user's behavior with the system. In some examples, data from the sensors is collected and analyzed. In such examples, sensors that are intended to detect the presence of a person in the building may be used to determine when the home is occupied. In response to determining when the building is occupied, the system may make a predictive schedule that predicts when the building will be occupied in the future. System decision can be based on the predictive schedule for lowering the building's internal temperature when the building is unoccupied and increasing the internal temperature before the building is predicted to be reoccupied. Such historical information about when the user is home or not may be used to determine the types of decisions that the user will desire the system to make verses the types of decisions that the user will want to retain.

In some situations, a history of user initiated actions is analyzed. For example, if the user consistently instructs the lighting system to turn off all lights in the building at 9:00 p.m., the system may infer that the user has a preference to turn off all of the building's lights at 9:00 p.m. Such a preference can be a user condition that the system determines based on the user's repetitive and consistent instructions to the system.

In another scenario, the historical behavior module 300 may consider how a user historically responses to recommendations from the system. For example, if the user repeatedly accepts a recommendation to turn off a lawn watering system when rain is detected in the area, the system may determine that the user has a preference to not water the lawn when it is raining outside. In contrast, if the user consistently ignores the recommendation to turn off the watering system during rainy weather, the system may determine that the user prefers to make that decision.

The task specific module 302 determines the user conditions on a per task basis. Such a task specific module 302 may track the conditions for each tasks or a subset of tasks that the system or the user can make.

The user specific module 304 determines the user conditions on a per user basis. For example, a building may be the residence for a first person and a second person. The user specific module 304 may separately track the user conditions for each user. In some situations, the system may determine that the first person turns on all of the lights in the front room upon arriving home from work, while the second person is inconsistent with which lights he or she turns on. The user specific module 304 may track the condition that the first person has a preference for turning on all of the lights while tracking that the second person does not have that preference.

The user input module 306 may collect data about the user's conditions through direct input from the user. In some examples, the system infers a condition of the user based on data collected about the user and submits a question to the user asking if a specific condition exists. In such an example, the system may ask the first person if he or she has a preference for having all of the lights on in the front room when entering the home. The user input module 306 may determine the user condition based on the user's response to that question. In other examples, the control unit 102 has a user interface where the user can instruct the system on his or her preferences. For example, the user may instruct the system sua sponte that he or she desires to have the system turn on all of the front room lights when he or she enters the building.

The user satisfaction module 308 can determine a user condition based on satisfaction ratings provided by the user about the system. In some examples, the user satisfaction module 308 sends a survey to the user about his or her experience with the system. If the user responds favorably about his or her experience, the user satisfaction module 308 may determine that the decisions currently being made by the system are satisfactory to the user. On the other hand, if the response by the user to the survey indicates that the user's experience with the system is poor, the user satisfaction module 308 may determine that the decisions currently being made by the system are not the user's preferences.

The user location module 310 considers the location of the user. The location of the user is a user condition that may affect how the system interacts with the user. In some situations, the system's level of autonomy may change based on whether the user is at the building or away from the building. For example, if the user's condition is that the user is away from his or her home, the system may decide to turn off an operating stove that appears to have been left on without consulting the user. However, if the user was home, the system may ask the user if he or she wanted the stove turned off before proceeding to turn off the stove.

The user location module 310 may determine the user's location based on a tracking device embedded in the user's mobile device. In other examples, the user location module 310 may determine the user's location based on the location of where the user logs into the internet, the location of where the user uses a credit card, a tracking device in the user's car, another mechanism, or combinations thereof.

The inference module 312 infers a user condition based on observations about other users. For example, the inference module 312 may be made aware that a high percentage of users from other buildings using similar systems consistently prefer to have the front door locked whether the building is occupied or not. The system may not have data that indicates that the user has the same preference, but the inference module 312 may infer that the user has such a preference based on the high percentage of other users with that preference.

The building module 314 determines the condition of the building when determining the condition of the user. For example, if the building is located in an area that has a high crime rate, the building module 314 may determine that the user should be concerned about vandalism, misconduct, and other types of crimes on the building's premise. In another example, the building module 314 may detect a fire alarm, a carbon monoxide alarm, a smoke alarm, another type of alarm, or combinations thereof to determine the user's condition. In such an example, if a fire alarm is active, the user's condition may be such that the user will not want to personally make a decision to turn off the stove that appears to have been left on even though the user typically desires to make such decisions. In this emergency situation, the user will likely desire the system to turn off the stove without input from the user.

While the above examples have been described with reference to specific mechanisms for determining a user condition, any appropriate mechanism for determining a user condition may be used in accordance to the principles described in the present disclosure. For example, the user condition may be determined by analyzing failures of the user to respond to recommendations by the system, analyzing historical behavior of the user, analyzing satisfaction ratings of the user, analyzing other types of information, performing another task, or combinations thereof.

Figure 4:
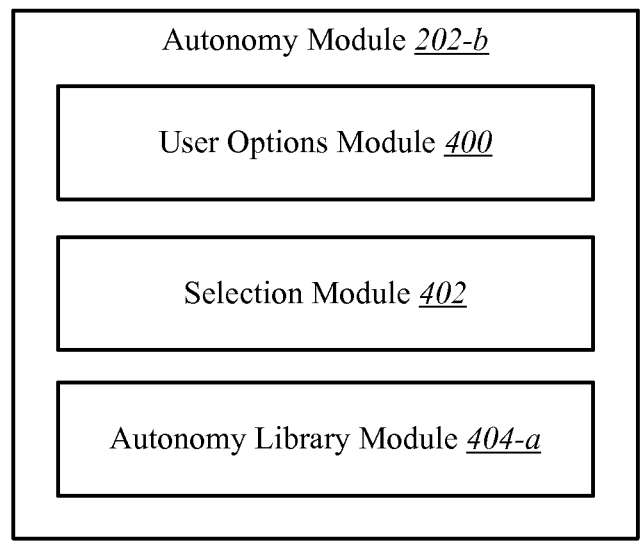
FIG. 4 is a block diagram of an example of an autonomy module of the control unit of FIG. 2.

FIG. 4 is a block diagram illustrating one example of an autonomy module 202-b. In this example, the autonomy module 202-b includes a user options module 400, a selection module 402, and an autonomy library module 404-a. The autonomy module 202-b may be an example of the autonomy module 202-a described with reference to FIG. 2.

The user options module 400 may provide the user with options for which level of autonomy the system should assign to the user, a specific task, a category of tasks, or combinations thereof. In some examples, the user options module 400 sends the user narrowly tailored options for how the user desires the system to interact with the user. The message may include data gathered by the system that explains why the system selected such options, such as the frequency that the user makes a certain decision, the frequency that a specific type of decision is made by the user, the frequency that a specific type of decision is made by the system, the reasons for why it may be better for the user to make a decision, the reasons for why it may be better for the system to make the decision, other information, or combinations thereof.

The selection module 402 selects the level of autonomy that is appropriate for the user, for a specific task with a specific user, or for another type of situation. The selection may be based on the user input, the user's response to options presented to the user from the user options module 400, the user conditions, other factors, or combinations thereof.

In some examples, each of the user conditions considered by the selection module 402 have equal weight. In other examples, the selection module 402 may assign a greater weight to specific user conditions than to other user conditions. For example, user conditions of the user being elderly or having poor health may be assigned a greater weight than a user condition that the other users in the neighborhood have a preference for something that is not well suited for those with poor health.

The selection module 402 may change the level of autonomy as deemed desirable. For example, the level of autonomy may change each time that the user leaves the building. Further, the level of autonomy may change based on user input. In yet another example, the level of autonomy may change based on the system observing a change in the user's historical behavior. While the above examples have been described with reference to specific situations where the autonomy level may change, any appropriate situation that provides a reasonable basis for changing the level of autonomy may be used in accordance with the principles described herein.

In some examples, the selection module 402 relies on input from the user to select the level of autonomy. In other situations, the selection module 402 selects the autonomy level without additional user input. The selection module 402 may notify the user of the level of autonomy selected for the user, for a specific task, or a specific situation, or combinations thereof.

The autonomy library module 404-a may include multiple levels of autonomy from which the selection module 402 can choose an appropriate level of autonomy. In some examples, the autonomy library module 404-a includes a set of default autonomy levels. Alternatively, the autonomy levels are constructed by the selection module and are inputted into the autonomy library module 404-a. The autonomy library module 404-a may be dynamic where different levels are created and/or removed.

Figure 5:
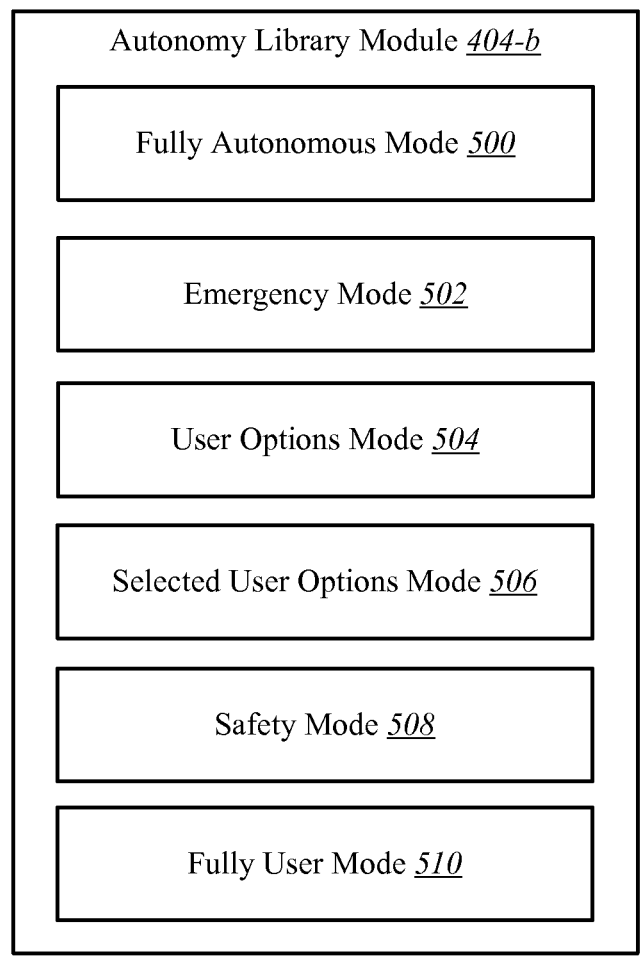
FIG. 5 is a block diagram of an example of an autonomy library module of the autonomy module of FIG. 4.

FIG. 5 is a block diagram illustrating one example of an autonomy library module 404-*b*. In this example, the autonomy library module 404-*b* includes a fully autonomous mode 500, an emergency mode 502, a user options mode 504, a selected user options mode 506, a safety mode 508, and a fully user mode 510. The autonomy library module 404-*b* may be an example of the autonomy library module 404-*a* described with reference to FIG. 4.

The fully autonomous mode 500 is a level of autonomy where the system makes all of the decisions on behalf of the user. Such a mode may be appropriate where the user is fully satisfied with the performance of the systems, where the user has a condition that affects his or her ability to make rational decisions, or where another appropriate situation exists for causing the system to make all of the decisions.

The emergency mode 502 is a level of autonomy where the user makes all of the decisions except in an emergency. In an emergency, the system may make decisions that the user would otherwise make. For example, a decision about whether to unlock a door may be made by the system if the system detects the sound of a fire alarm, a carbon monoxide alarm, another type of alarm indicating an emergency, or combinations thereof. In another example, if the system detects that the user is injured, and may be unable to make decisions based on the circumstances, the system may notify medical personnel, turn off stoves, perform other tasks, or combinations thereof.

The user options mode 504 is a level of autonomy where the system gives the user at least one option before executing a task. Such decisions may be based on circumstances where the system believes that the user desires a certain action, but the system still allows the user to make the final decision. For example, the system may send a request to the user asking if the system should turn off lights when 9 p.m. arrives, turn off the sprinkler system when it is raining, do another task based on the circumstances, or combinations thereof.

The selected user options mode 506 is a level of autonomy where the system gives the user the option to make the decision for just specific types of tasks and the other tasks are performed by the system. For example, the system may give the user options regarding the security system before performing a task, but may make decisions autonomously for the climate control system, the lighting system, the watering system, the door system, and for other systems.

The safety mode 508 is a level of autonomy where the user makes all the decisions except for those decisions that deal with safety. Decisions that deal with safety may include, but are not limited to, turning off a stove that appears to have been left unattended, turning off a treadmill when a young child appears to be approaching an operating treadmill, preventing another dangerous situation, or combinations thereof.

The fully user mode 510 is a level of autonomy where the user makes all of the decisions. Such a level of autonomy may be selected when the user wants to have greater control over the systems in the building, such as when the user is having a special event, the user is having a visitor, or another situation where the user desires more control.

While the examples of the autonomy library module have been described with reference to specific levels of autonomy, any appropriate type of autonomy level may be made in accordance with the principles described in the present disclosure. In some examples, additional levels of autonomy are included in the library. However, in other examples fewer levels of autonomy are include or different types of levels of autonomy are included. Further, the selection module 402 may include the ability to add new types of levels of autonomy into the library when an appropriate autonomy level does not already exist for a specific situation.

Further, the levels of autonomy may be for different users. For example, the level of autonomy may be different for a first resident than for a second resident of a building. Further, the level of autonomy may be different for a babysitter, out of town guest, neighbor, child, another type of person, or combinations thereof.

Figure 6:
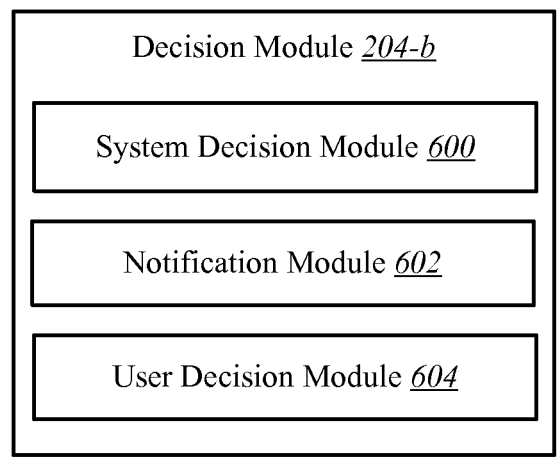
FIG. 6 is a block diagram of an example of an decision module of the control unit of FIG. 2.

FIG. 6 is a block diagram illustrating one example of a decision module 204-*b*. In this example, the decision module 204-*b* includes a system decision module 600, a notification module 602, and a user decision module 604. The decision module 204-*b* may be an example of the decision module 204-*a* described with reference to FIG. 2.

The system decision module 600 makes the decision that is to be performed by the system based on the level of autonomy. For examples, if the selected level of autonomy is the fully autonomous mode 500, then the system decision module 600 executes all of the decisions autonomously for the system. Likewise, if the selected level of autonomy is the emergency mode 502, the system decision module 600 makes the decisions for the system when there is a detected emergency.

The notification module 602 sends notifications to inform the user about the decisions executed by the system. For example, the notification module 602 may send a notification to the user indicating that the furnace in the building has been reset in response to determining that the building will likely be unoccupied for the remainder of the afternoon. In some examples, the user has an option to select which types of notifications that the user wants to receive from the notification module 602. For example, the user may desire to be notified about decisions made for specific systems or for specific tasks. In such a situation, the notification module 602 will not send notifications for the other decisions made by the system.

The user decision module 604 allows the user to make the decisions. In some examples, the user decision module 604 sends a message to the system decision module 600 indicating that a specific decision is to be made by the user.

While this example has been described with reference to a specific type of decision module 204-*b*, any appropriate type of decision module 204-*b* may be used in accordance with the principles described herein. For example, the decision module 204-*b* may include more or fewer modules than presented in the example of FIG. 6.

Figure 7:
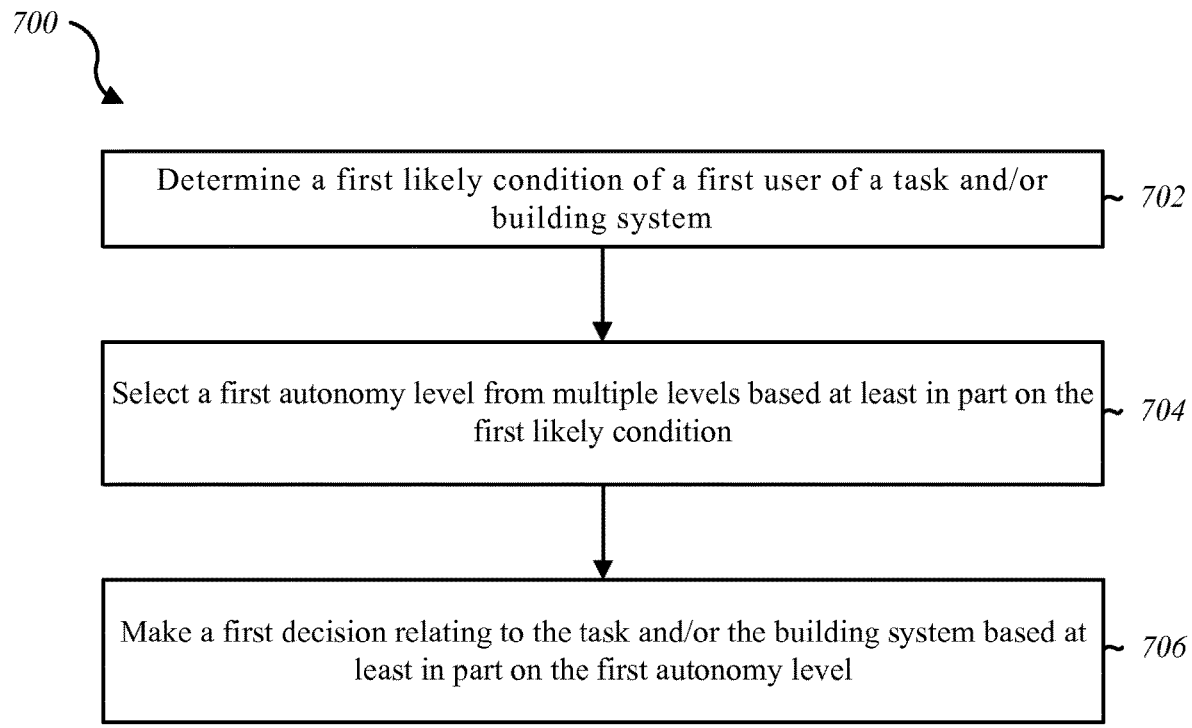
FIG. 7 is a flow diagram illustrating an example of a method for selecting a level of autonomy.

FIG. 7 is a flow diagram illustrating one embodiment of a method 700 for selecting a level of autonomy. In this example, the method 700 includes determining 702 a first likely condition of a first user of a task and/or a building system, selecting 704 a first autonomy level from multiple levels based at least in part on the first likely condition, and making 706 a first decision relating to the task and/or the building system based at least in part on the first autonomy level. Such a method 700 may be implemented with a control unit 102 shown in FIGS. 1 and/or 2. In other examples, method 700 may be performed generally by the environment 100 shown in FIG. 1.

At block 702, a first likely condition of a first user of a task and/or a building system is determined. Such a user condition may be a user preference, a circumstance of the building that may affect how the user would react, a location of the user, an inference about the user, a health condition of the user, an age of the user, a habit of the user, another type of user condition, or combinations thereof. Such user conditions may be gathered from observations about the user through sensors, analysis of the user's historical behavior, observations about other users, user input, other sources, or combinations thereof. In some examples, a task is a procedure implemented by the building system or just associated with the building system. In some examples, the task is part of a service associated with the building system.

At block 704, a level of autonomy is selected from multiple levels based at least in part on the user's condition. For example, a level of autonomy that allows the user to make just those decisions from a watering system while the system makes the decisions affecting other systems may be selected in response to observations that the user accepts all of the system's recommendations for all of the systems except for the watering system. In other examples, the level of autonomy may be selected based on a habit of the user where the user frequently forgets to turn off lights in his or her house before going to bed. In such an example, the system may select a level of autonomy where the lighting system makes a decision about turning off the lights in the user's home without input from the user.

At block 706, a first decision is made relating to the task and/or the building system based at least in part on the first autonomy level. Such a decision may be those decisions that the building system makes versus the decisions that the user makes. In other words, the autonomy level may allocate some of the decision making ability to the building system and the remainder of the decision making ability to the user. The first decision is a decision within the building system's allocated sphere of decision making.

Figure 8:
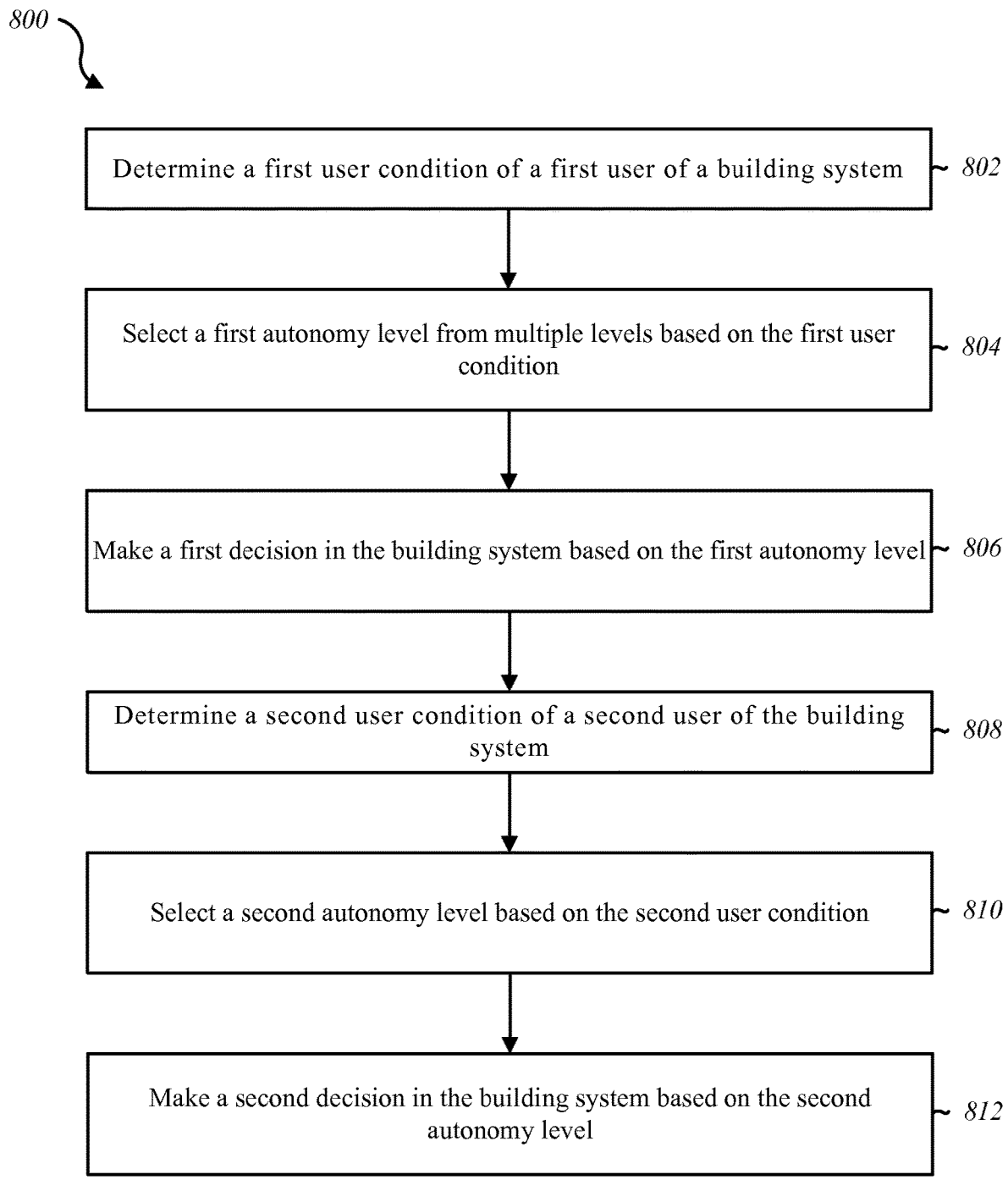
FIG. 8 is a flow diagram illustrating an example of a method for selecting a level of autonomy.

FIG. 8 is a flow diagram illustrating one embodiment of a method 800 for selecting a level of autonomy. In this example, the method 800 includes determining a first user condition of a first user of a building system 802, selecting a first autonomy level from multiple levels based on the first user condition 804, making 806 a first decision in the building system based on the first autonomy level, determining 808 a second user condition of a second user of the building system, selecting 810 a second autonomy level based on the second user condition, making 812 a second decision in the building system based on the second autonomy level. Such a method 800 may be implemented with a control unit shown in FIGS. 1 and/or 2. In other examples, method 800 may be performed generally by the environment 100 shown in FIG. 1.

At block 808, a second user condition of a second user of the building system is determined. Such a second user condition may be the same as the first condition or the second user condition may be different than the first user condition. However, the second user is different than the first user. For example, the second user may be another resident in a building, another co-worker in a building, a visitor, another type of person, or combinations thereof.

At decision 810, a second level of autonomy is selected based on the second user condition. The second level of autonomy may be the same level of autonomy as the first level of autonomy. While the first and second levels of autonomy may be the same, each level of autonomy may be selected independently. In some examples, the same level of autonomy is selected even though the first and second users have different users conditions. In other examples, the first and second levels of autonomy are different.

At decision 812, a second decision is made based on the second level of autonomy. The second decision can be a decision that is made on behalf of the second user.

Figure 9:
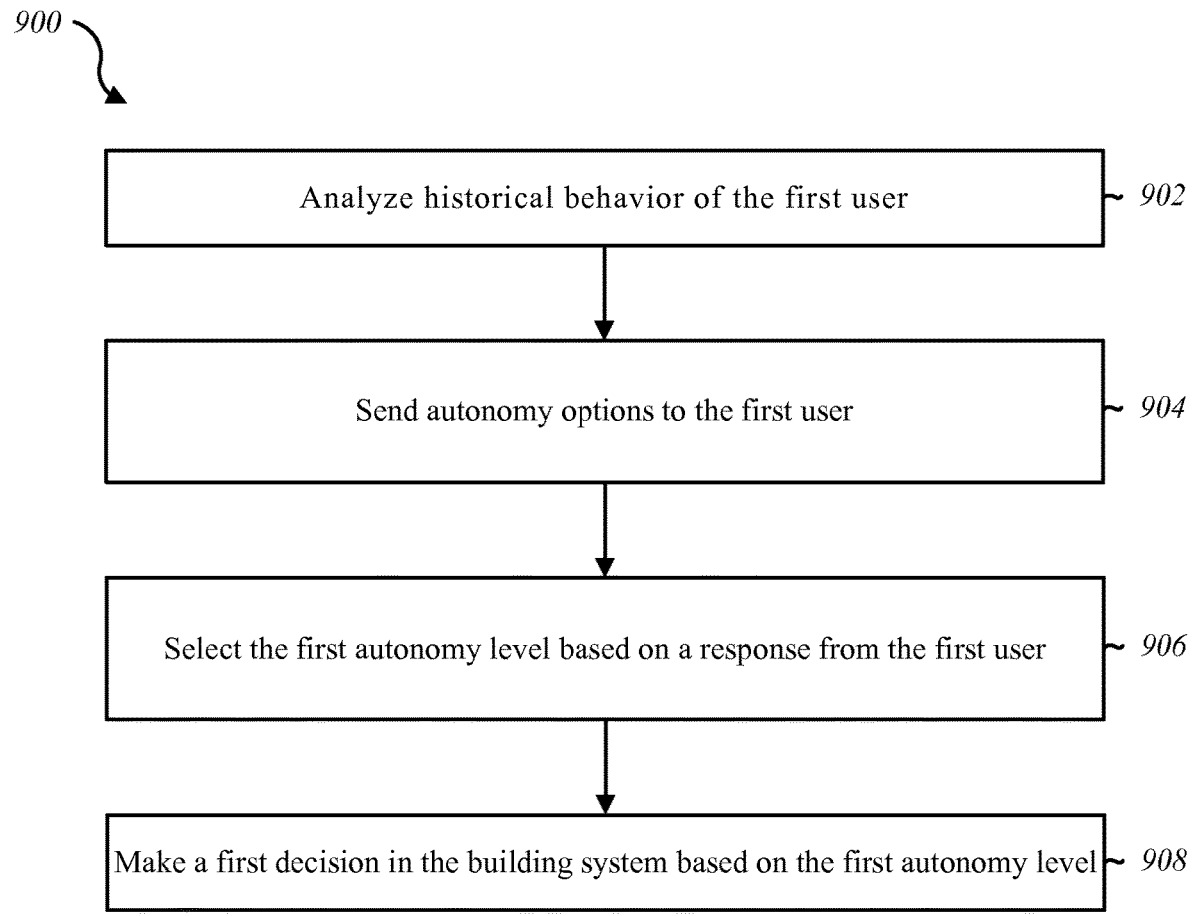
FIG. 9 is a flow diagram illustrating an example of a method for selecting a level of autonomy.

FIG. 9 is a flow diagram illustrating one embodiment of a method 900 for selecting a level of autonomy. In this example, the method 900 includes analyzing 902 historical behavior of the first user, sending 904 autonomy options to the first user, selecting 906 the first autonomy level based on a response from the first user, and making 908 a first decision in the building system based on the first autonomy level. Such a method 900 may be implemented with a control unit 102 in FIGS. 1 and/or 2. In other examples, method 900 may be performed generally by the environment 100 shown in FIG. 1.

At block 902, the historical behavior of the first user is analyzed. Such historical behavior may be recorded by sensors distributed throughout the building. The historical behavior of the first user may be stored locally at the control unit 102, or the historical behavior may be stored off site in a remote computing device, such as a cloud based device. The historical behavior may span any appropriate time period. For example, the historical behavior of the user may span a couple of minutes to years.

At block 904, autonomy options are sent to the first user. The autonomy options may allow the user to select a level of autonomy. Such levels of autonomy sent to the first user may be a subset of all the autonomy levels available where autonomy levels that do not appear to be well suited for the first user are not sent. For example, if the historical behavior of the first user reveals that the first user often disregards recommendations from the building system, an autonomy level that gives the building system the ability to make all decisions without input from the user may not be included in the autonomy levels sent to the first user.

At block 906, the first autonomy level is selected based on a response from the user. For example, if the first user responds indicting which of the sent autonomy levels is the desired autonomy level, the desired autonomy level may be selected.

At block 908, a decision is made based on the autonomy level selected. For example, if the selected autonomy level allows the system to make decisions regarding the watering system, the first decision may be in regards to a task associated with watering.

Figure 10:
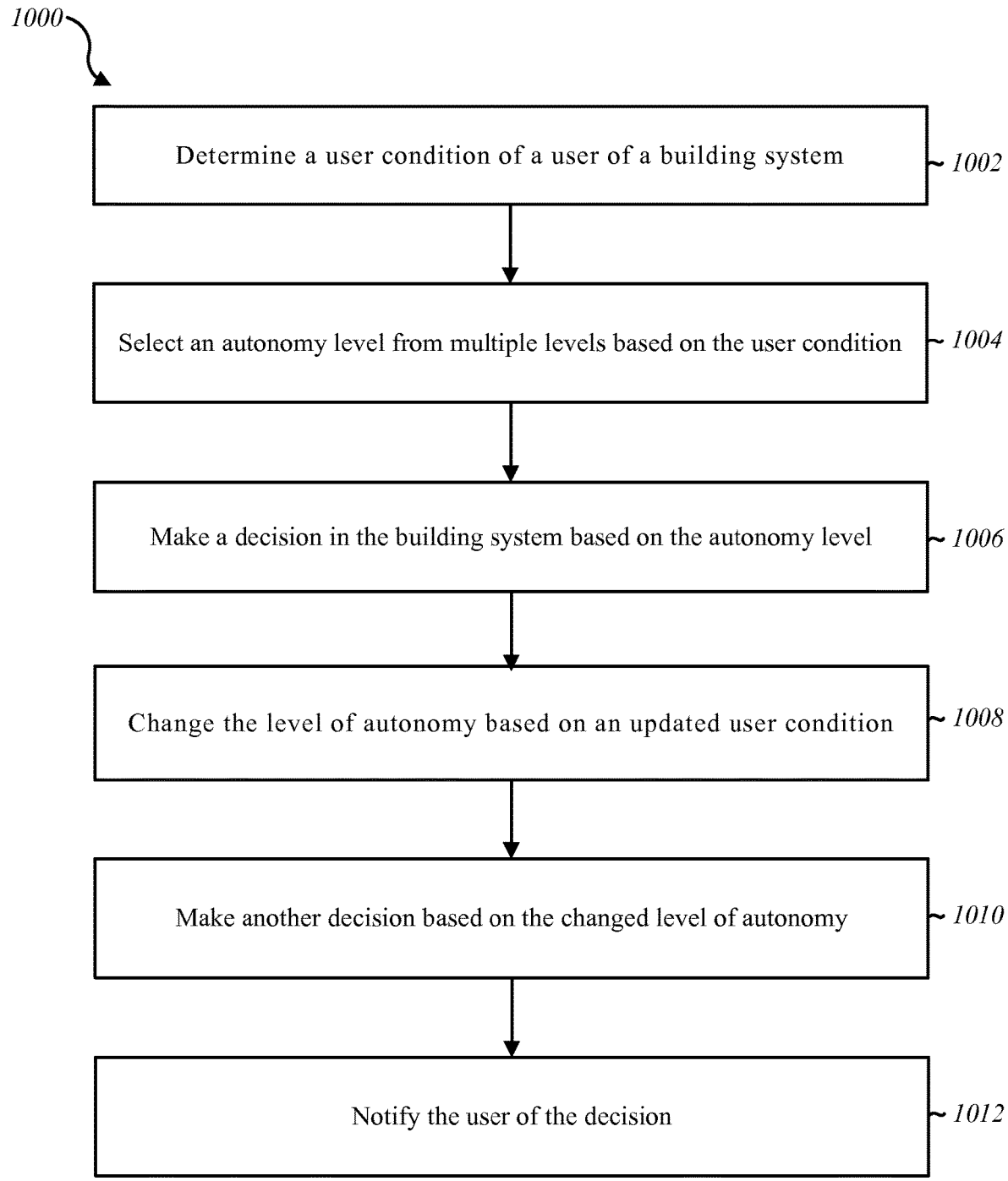
FIG. 10 is a flow diagram illustrating an example of a method for selecting a level of autonomy.

FIG. 10 is a flow diagram illustrating one embodiment of a method 1000 for selecting a level of autonomy. In this example, the method 1000 includes determining 1002 a user condition of a user of a building system, selecting 1004 an autonomy level from multiple levels based on the user condition, making 1006 a decision in the building system based on the autonomy level, changing 1008 the level of autonomy based on an updated user condition, making 1010 another decision based on the changed level of autonomy, and notifying 1012 the user of the decision. Such a method 1000 may be implemented with a control unit 102 in FIGS. 1 and/or 2. In other examples, method 1000 may be performed generally by the environment 100 shown in FIG. 1.

At block 1008, the level of autonomy is changed based on an updated user condition. The user condition may be updated based on new observations recorded by the building's users, input from the user, a change in the user's location, a temporary situation such as having a visitor at the building, another type of change, or combinations thereof.

At block 1010, another decision is made based on the changed level of autonomy. For example, if the changed level of autonomy is a level of autonomy that gives the system a greater ability to make decisions, the decision may be a decision that the system did not previously have. In other examples, the decision may be a decision that the building system had the ability to make before the autonomy level change.

At block 1012, a notification is sent to the first user of the decision that was made. The notification may be sent to a mobile device of the user, announced audibly over a speaker in the vicinity of the user, presented in a display of the control unit, sent to the user through another mechanism, or combinations thereof.

While the examples above have been described with reference to specific levels of autonomy, any appropriate type of interaction between the building system and the user may be used in accordance with the principles described in the present disclosure. In some cases, the building system may provide the user with a set or a subset of decisions from which the user can choose to have the building system execute for him or her. For example, the building system may give the user a number of recipes to choose from based on the items available in the refrigerator, and the user can select one of the recipes for dinner. In another situation, the building system can narrow down the options to just those options that are well suited for the user. For example, instead of presenting different heating/cooling schedules to the customer, the building system may present to the user just three modes: maximum comfort, maximum savings, and balanced mode. In such a situation, the user does not have to analyze schedules to determine if such schedules meet his or her needs, instead the user can selection an option that is achieves his or her desires, and the building system determines the details to achieve the user's desires.

In other situations, the building system suggests the a solution to the user and the user can accept or deny the suggestion. For example, if the building system detects that the building is unoccupied, but security is not armed, the building system may recommend that the security system be armed. In such a scenario, the user can choose to accept or deny the recommendation. In another situation, the building system may give the user a predetermined window of time to approve the recommendation. If the user provides no response within the predetermined window, the building system may automatically execute the recommendation. For example, the building system may detect that the user is on vacation and propose to adjust the thermostat to save on energy cost. If the system receives no response from the user (presumably because the customer is on vacation and couldn't be reached), the system may automatically adjust the thermostat after the predetermined window of time passes.

In other situations, the building system executes a decision and informs the user after the decision has already been executed. For example, when a fire alarm is tripped, the building system may automatically notify the fire station to have firefighters deployed. After the notification is sent, the building system can inform the user about sending the notification. In another situation, the building system executes an action and only informs the user depending on the type of action executed. For example, when the building system detects that an elderly user falls because of medical conditions, the building system can automatically notify the appropriate station to dispatch the paramedics. The building system can notify the elderly user about the dispatch. However, the building system may not notify the elderly user that the building system also unlocked the door for the paramedics and turned off the stove.

In yet other situations, the building system may executes decisions and only inform the user when asked. For example, the building system may start a camera recording automatically when someone is detected in a room (or at a door) and then automatically starts/stops different cameras in different rooms following the person's movement. When no motion is detected for a time period the building system may stop all cameras and join these clips from different cameras into one video file. This video file may only be provided when the user requests the video file. In other situations, the building system may execute a decision, and when asked, the building system decides whether or not to inform the user or decides what level of detail to inform the user. For example, the building system may automatically adjust the water duration of the sprinkler system based on recent weather conditions (e.g., rain drop volume, daytime temperature) and only informs the user when the schedule change is major and does not burden the user with notifications about all the minor changes.

In another situation, the building system does everything by itself and only takes suggestions from the user. In some examples, the building system changes the angle of solar panels depending on the season, the time of day, and the weather to maximize solar energy generation. Such angle changes are executed by just the building system without input from the user. However, the building system may take suggestions from the user on solar panel maintenance issues.

In some cases, the building system sends all activities detected to the user. If the user finds that much information to be too time consuming to review, the user can instruct building system to only send unusual activities. In some cases, the building system normally locks the door and arms the security on an automatic schedule. But, if the user plans on having friends visit and stay, the user may request that the building system to send requests to arm or disarm the system while the visitors are staying. In another situation, the user desires to have the building system ask permissions to manage smart HVAC and sprinkler schedule changes. However, is the user has to leave town suddenly, the user can instruct the building system to automate these systems without requesting permission from the user.

Figure 11:
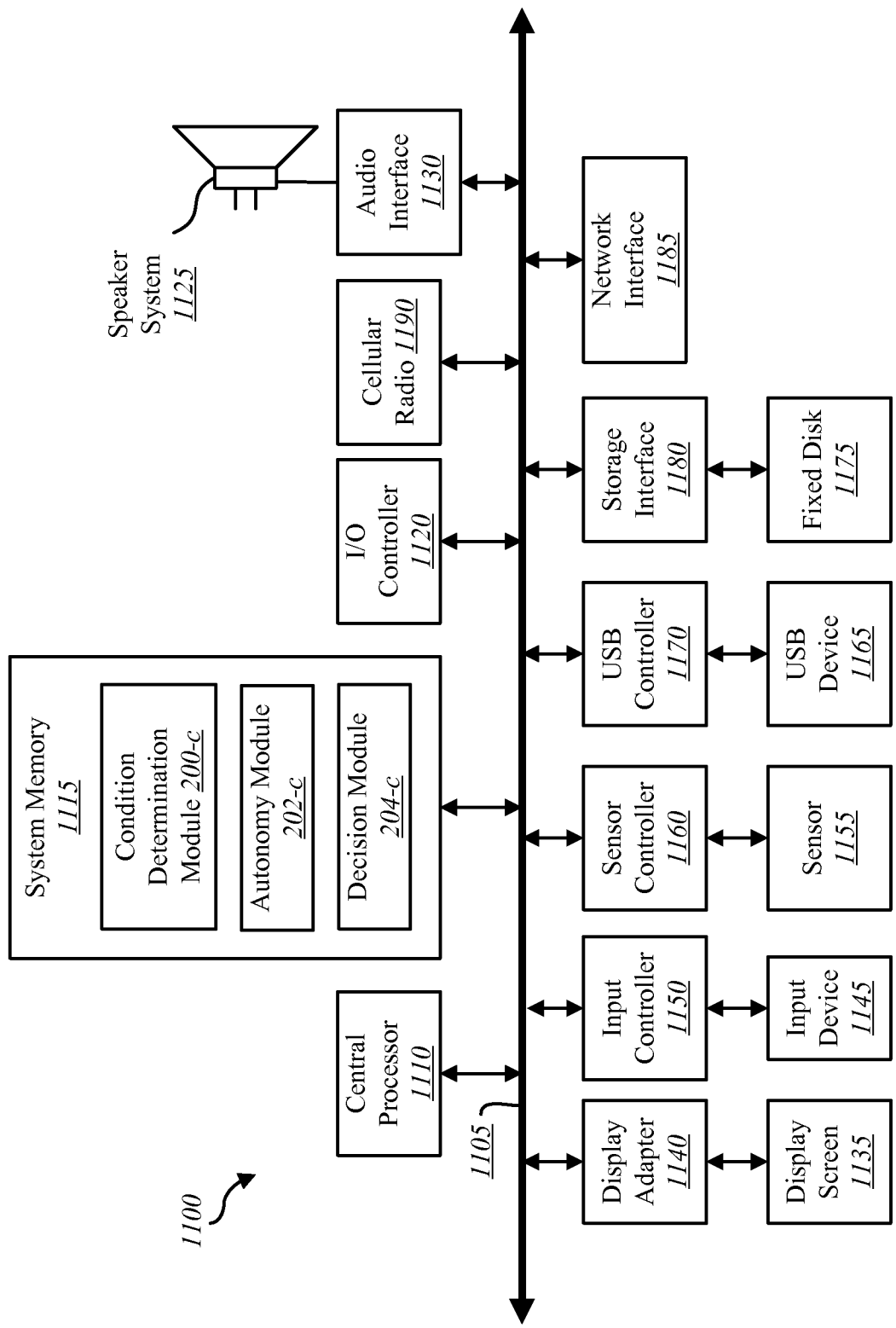
FIG. 11 is a block diagram of a computer system suitable for implementing the present systems and methods of FIG. 1.

FIG. 11 depicts a block diagram of a controller 1100 suitable for implementing the present systems and methods. The controller 1100 may be an example of the control unit 102-*a* in FIG. 1. In one configuration, controller 1100 includes a bus 1105 which interconnects major subsystems of controller 1100, such as a central processor 1110, a system memory 1115 (typically RAM, but which may also include ROM, flash RAM, or the like), an input/output controller 1120, an external audio device, such as a speaker system 1125 via an audio output interface 1130, an external device, such as a display screen 1135 via display adapter 1140, an input device 1145 (e.g., remote control device interfaced with an input controller 1150), multiple USB devices 1165 (interfaced with a USB controller 1170), one or more cellular radios 1190, and a storage interface 1180. Also included are at least one sensor 1155 connected to bus 1105 through a sensor controller 1160 and a network interface 1185 (coupled directly to bus 1105).

Bus 1105 allows data communication between central processor 1110 and system memory 1115, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a condition determination module 200-*c*, autonomy module 202-*c*, and a decision module 204-*c* may be used to implement the present systems and methods may be stored within the system memory 1115. These modules may be an example of the modules illustrated in FIG. 2. Applications resident with controller 1100 are generally stored on and accessed via a non-transitory computer readable medium, such as a hard disk drive (e.g., fixed disk 1175) or other storage medium. Additionally, applications can be in the form of electronic signals modulated in accordance with the application and data communication technology when accessed via network interface 1185.

Storage interface 1180, as with the other storage interfaces of controller 1100, can connect to a standard computer readable medium for storage and/or retrieval of information, such as a fixed disk drive 1175. Fixed disk drive 1175 may be a part of controller 1100 or may be separate and accessed through other interface systems. Network interface 1185 may provide a direct connection to a remote server via a direct network link to the Internet via a POP (point of presence). Network interface 1185 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1100 wirelessly via network interface 1185. In one configuration, the cellular radio 1190 may include a receiver and transmitter to wirelessly receive and transmit communications via, for example, a cellular network.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 11 need not be present to practice the present systems and methods. The devices and subsystems can be interconnected in different ways from that shown in FIG. 11. The aspect of some operations of a system such as that shown in FIG. 11 are readily known in the art and are not discussed in detail in this application. Code to implement the present disclosure can be stored in a non-transitory computer-readable medium such as one or more of system memory 1115 or fixed disk 1175. The operating system provided on controller 1100 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for selecting a level of autonomy by a processor of a security and/or automation system, comprising:
   determining a first likely condition of a first user in relation to at least one of a task and building system;
   identifying, in relation to determining the first likely condition of the first user, information associated with a location of the first user;
   assigning a first weight to the first likely condition of the first user, the first weight being based at least in part on the first likely condition including at least one of a user age, a user health, a user medical condition, a user in a detected alarm condition, or any combination thereof;

selecting a first autonomy level from multiple autonomy levels, based at least in part, on the determined first likely condition, the first weight, and the identified information associated with the location of the first user, wherein the first autonomy level comprises a first level of interaction between the first user and the security and/or automation system, wherein the location of the first user is based at least in part on a location of a device associated with the first user;

determining a second likely condition of the first user based at least in part on a change in the location of the first user;

assigning a second weight to the second likely condition of the first user, the second weight being based at least in part on the second likely condition including at least one of the user age, the user health, the user medical condition, the user in the detected alarm condition, or any combination thereof;

selecting a second autonomy level from the multiple autonomy levels based at least in part on the determined change in the location of the first user and the second weight, the second autonomy level being different from the first autonomy level, wherein the second autonomy level comprises a second level of interaction between the first user and the security and/or automation system;

modifying autonomy options for sending to the first user based at least in part on the second level of interaction; and making a first decision relating to the at least one of the task and the building system based at least in part on the modified autonomy options.

2. The method of claim 1, wherein determining the first likely condition comprises analyzing historical behavior of the first user.

3. The method of claim 1, wherein determining the first likely condition comprises analyzing behavior of other users with a profile similar to the first user.

4. The method of claim 1, wherein determining the first likely condition comprises analyzing a general user population.

5. The method of claim 1, wherein the first likely condition is a task specific user condition.

6. The method of claim 1, wherein selecting the second autonomy level comprises:
sending the modified autonomy options to the first user and selecting the second autonomy level based on a response from the first user.

7. The method of claim 1, further comprising:
determining the second likely condition for a second user in relation to the at least one of the task and the building system;
selecting the second autonomy level based at least in part on the second likely condition; and
making a second decision relating to the at least one of the task and the building system based on the second autonomy level.

8. The method of claim 1, wherein the building system is a climate control system.

9. The method of claim 1, wherein the building system is a lighting system.

10. The method of claim 1, wherein the building system is a security system.

11. The method of claim 1, further comprising:

changing the first autonomy level based on an updated likely condition.

12. The method of claim 1, further comprising:
changing the first autonomy level based on user input.

13. The method of claim 1, wherein determining the first likely condition comprises:
analyzing satisfaction ratings from the first user about autonomous actions taken by the building system.

14. The method of claim 1, wherein determining the first likely condition comprises:
analyzing failures of the first user to respond to a recommendation made by the building system.

15. The method of claim 1, wherein the first likely condition is the location of the first user.

16. The method of claim 1, wherein the first likely condition is a building condition.

17. The method of claim 1, further comprising:
notifying the first user of the first decision.

18. A computing device associated with a processor of a security and/or automation system, configured for selecting a level of autonomy, comprising:
the processor;
memory in electronic communication with the processor; and
instructions stored in the memory, the instructions being executable by the processor to:
determine a first likely condition of a first user of a building system;
identify, in relation to determining the first likely condition of the first user, information associated with a location of the first user;
assign a first weight to the first likely condition of the first user, the first weight being based at least in part on the first likely condition including at least one of a user age, a user health, a user medical condition, a user in a detected alarm condition, or any combination thereof;
select a first autonomy level from among multiple autonomy levels, the selection based at least in part on the determined first likely condition, the first weight, and the identified information associated with the location of the first user, wherein the first autonomy level comprises a first level of interaction between the first user and the security and/or automation system, wherein the location of the first user is based at least in part on a location of a device associated with the first user;
determine a second likely condition of the first user based at least in part on a change in the location of the first user;
assign a second weight to the second likely condition of the first user, the second weight being based at least in part on the second likely condition including at least one of the user age, the user health, the user medical condition, the user in the detected alarm condition, or any combination thereof;
select a second autonomy level from the multiple autonomy levels based at least in part on the determined change in the location of the first user and the second weight, the second autonomy level being different from the first autonomy level, wherein the second autonomy level comprises a second level of interaction between the first user and the security and/or automation system;
modifying autonomy options for sending to the first user based at least in part on the second level of interaction; and make a first decision in the building system based at least in part on the modified autonomy options.

19. The computing device of claim 18, wherein the instructions executable by the processor to determine the first likely condition and the second likely condition are executable by the processor to:

analyze historical behavior of the user.

20. A computer-program product associated with a processor of a security and/or automation system, configured for selecting a level of autonomy, the computer-program product comprising a non-transitory computer-readable medium having instructions thereon, the instructions being executable by the processor to:

determine a first likely condition of a first user of a building system;

identify, in relation to determining the first likely condition of the first user, information associated with a location of the first user;

assign a first weight to the first likely condition of the first user, the first weight being based at least in part on the first likely condition including at least one of a user age, a user health, a user medical condition, a user in a detected alarm condition, or any combination thereof;

select a first autonomy level from among multiple autonomy levels, the selection based at least in part on the determined first likely condition, the first weight, and the identified information associated with the location of the first user, wherein the first autonomy level comprises a first level of interaction between the first user and the security and/or automation system, wherein the location of the first user is based at least in part on a location of a device associated with the first user;

determine a second likely condition of the first user based at least in part on a change in the location of the first user;

assign a second weight to the second likely condition of the first user, the second weight being based at least in part on the second likely condition including at least one of the user age, the user health, the user medical condition, the user in the detected alarm condition, or any combination thereof;

select a second autonomy level from the multiple autonomy levels based at least in part on the determined change in the location of the first user and the second weight, the second autonomy level being different from the first autonomy level, wherein the second autonomy level comprises a second level of interaction between the first user and the security and/or automation system;

modifying autonomy options for sending to the first user based at least in part on the second level of interaction; and make a first decision in the building system based at least in part on the modified autonomy options.

* * * * *